May 18, 1926. 1,585,388
F. E. IVES ET AL
METHOD OF PRODUCING PRINTS IN BLACK AND A SINGLE
COLOR AND THE RESULTING PRODUCT
Filed Oct. 12, 1923

*Fig. 1.*

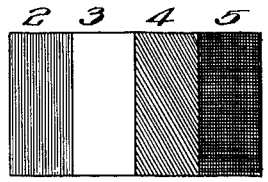

RED   WHITE   GREEN   BLACK

*Fig. 2.*

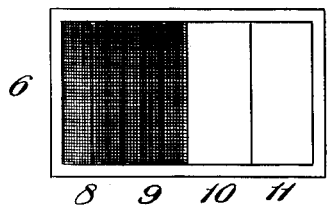

*Fig. 3.*

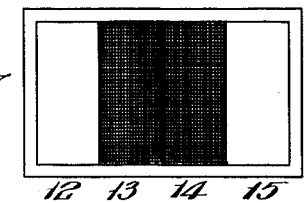

*Fig. 4.*

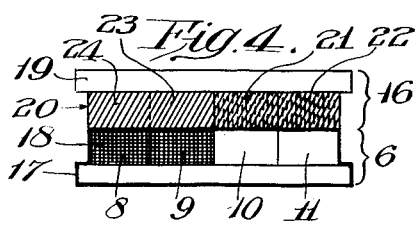

*Fig. 5.*

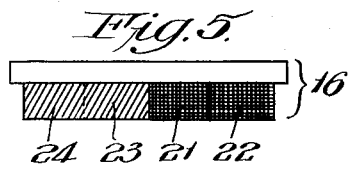

*Fig. 6.*

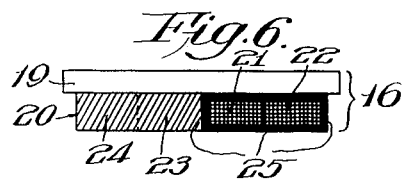

*Fig. 7.*

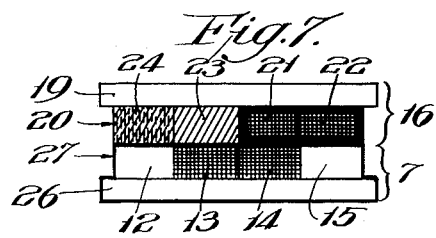

*Fig. 8.*

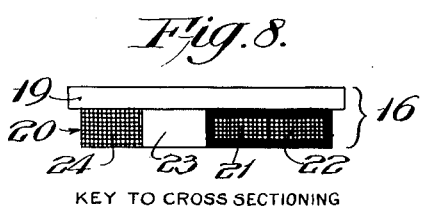

*Fig. 9.*

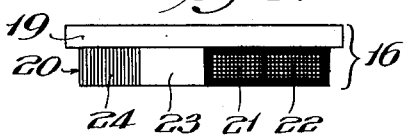

KEY TO CROSS SECTIONING

*Fig. 10.*

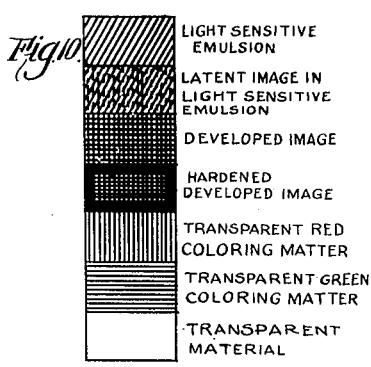

LIGHT SENSITIVE EMULSION

LATENT IMAGE IN LIGHT SENSITIVE EMULSION

DEVELOPED IMAGE

HARDENED DEVELOPED IMAGE

TRANSPARENT RED COLORING MATTER

TRANSPARENT GREEN COLORING MATTER

TRANSPARENT MATERIAL

INVENTOR:
Frederic Eugene Ives,
BY Jacob F. Leventhal,
Friedersheim Fairbanks.
ATTORNEYS.

Patented May 18, 1926.

1,585,388

UNITED STATES PATENT OFFICE.

FREDERIC EUGENE IVES, OF PHILADELPHIA, PENNSYLVANIA, AND JACOB F. LEVENTHAL, OF NEW YORK, N. Y.

METHOD OF PRODUCING PRINTS IN BLACK AND A SINGLE COLOR AND THE RESULTING PRODUCT.

Application filed October 12, 1923. Serial No. 668,042.

Our invention comprehends a novel method of producing prints in black and a single color and the resulting product.

A black and single color print is one in which a subject is reproduced as an ordinary photographic monochrome with the exception that the areas that were of substantially a single desired color are reproduced in substantially that color in the finished product. While we contemplate making red the color to be reproduced, we do not limit our invention to the use of that color, nor do we mean, by the term "red" only the actual reds of the subject. While in the finished print all the colored areas will be of substantially the same color, though of different intensities, the areas in the subject might have ranged from orange to deep red.

It will be obvious to those skilled in the art that two negative records will be required, which records, though geometrically alike, must have certain color recording differences.

In a previous application filed by Jacob F. Leventhal, on August 6, 1923, Serial No. 655,923, it is stated that a special negative called a "spot" negative, which is a record of only the areas that are to be colored in the finished print, is necessary, and methods were described for producing the said "spot" negative.

One of the objects of the present invention is to get the desired result without making a "spot" negative but by working from the two original negative records made directly from the subject.

For the purpose of illustrating our invention, we have shown in the accompanying drawings a typical embodiment thereof which is at present preferred by us, since this embodiment will be found in practice to give satisfactory and reliable results, although it is to be understood that the various instrumentalities of which our invention consists can be variously arranged and organized and that our invention is not limited to the precise arrangement and organization of these instrumentalities as herein shown and described.

Figure 1 represents, schematically, the subject which is to be reproduced according to our method.

Figures 2 and 3 represent, diagrammatically, negative records made from the subject seen in Figure 1 either successively or simultaneously.

Figure 4 represents, in cross section, a step in the process of producing the finished print.

Figure 5 represents, in cross section, a further step.

Figure 6 represents a further step.

Figure 7 represents a further step.

Figure 8 represents a further step.

Figure 9 represents the final product.

Figure 10 represents a key to the cross sectioning.

Similar numerals of reference indicate corresponding parts.

Referring to the drawings,

In carrying out our novel method, we produce by the action of light on photographic emulsions containing, for example, silver salts, two geometrically alike and registrable negative images of a given subject, either simultaneously or successively, as may be desired, and develop and fix them in the usual manner.

One image is recorded by rays of substantially the color desired in the finished result, such as orange to red, and the other is recorded by rays other than the said desired rays, such as the green rays. The important point here is that one is made exclusively by the orange to red, while the other is made by any or all rays but the orange to red.

Assuming that the color desired in the finished print is substantially orange to red, the two negatives are made, one by orange to red light and the other by say green light. They are developed and fixed in the usual way.

A print is now made in the usual photographic manner from the red record which print is developed but not fixed. It is then immersed in a bath that will act on the image so that it will not be affected by a later coloring process.

The next step is to print from the green record negative on the same area that was already exposed to the red negative, it being necessary to first bring the geometrically alike positive and negative records into accurate registry.

The exposure having been made, the print is developed a second time, and it will be found that substantially no record has been made except at the orange to red areas, the positive and negative records having combined to form a mask except at those areas. We then fix in the usual way.

It now remains simply to color the image that was not previously treated against such coloring.

For the purpose of illustration only, we have shown schematically in Figure 1 a subject 1 having a portion 2 which has orange to red color, a portion 3 which is white, a portion 4 which is green and a portion 5 which is black.

In Figures 2 and 3, we have shown developed and fixed negatives 6 and 7, which are provided with portions 8, 9, 10, 11 and 12, 13, 14, 15, respectively, corresponding to the portions 2, 3, 4, 5 of the subject 1, the negative 6 being a record of the subject 1 made by orange to red rays and the negative 7 being a record of the subject 1 made by green rays. While the two negatives are geometrically alike, certain differences are apparent. In the red negative 6, the red portion 2 of the subject 1 has been recorded, as shown at 8, but in the green negative 7, the portion has not been recorded, as shown at 12. The white portion 3 of the subject 1 has affected both negatives substantially alike, since white contains both red and green rays and this is indicated in the red negative 6, at portion 9, and in the green negative 7 at portion 13. The green portion 4 of the subject has not affected the red negative 6, as shown at 10, but has affected the green negative 7, as shown at 14. The black portion 5 of the subject has of course affected neither of the negatives, as shown at 11 and 15.

The next step is to make a print from the red negative 6. At Figure 4, we have shown it in cross section in contact with a suitable light sensitive material and carrier 16.

The negative 6 appears in cross section as consisting of a transparent carrier 17 on which is the coating 18 containing the image portions 8 and 9. The photographic material 16 consists of a carrier 19 on which is coated the light sensitive emulsion 20.

While the two emulsion surfaces are shown in contact, this is not a necessary feature, as it may be necessary, in some cases, to have an emulsion surface in contact with a carrier surface or even to have two carrier surfaces in contact, depending on the method employed in forming the negatives, and also prints can be made by projection instead of by contact.

By passing light through the negative 6, we record a latent image of the transparent areas 10 and 11, as shown at 21 and 22. The light is prevented from passing through at 8 and 9, consequently no image is recorded at these points and the areas 23 and 24 remain unaffected.

In Figure 5, the print 16 is shown as developed but not fixed. The portions 23 and 24 are consequently still sensitive to light.

The next step is to treat the developed image in the portions 21 and 22 in such a way as to harden it, or in other ways prevent it from being affected by a subsequent dyeing process.

This may be accomplished by immersing the unfixed print in the following solution:— water 11 litres, potassium bromide 227 grams, potassium bichromate 114 grams.

In Figure 6, this hardening effect is shown diagrammatically by the heavy line 25.

At Figure 7, we have shown the green negative 7 in cross section as consisting of a carrier 26 on which is the coating 27 containing the image portions 13 and 14. In registered contact with it has been placed the unfixed print 16. By passing light through the negative 7, we obtain a latent image at 24.

The areas 23, 21 and 22, being in registered contact with the areas 13, 14 and 15, it will be seen that light does not act in the areas 23, 21 and 22.

The print 16 may now be developed and fixed and is so shown at Figure 8.

The print is now ready for the coloring process and inasmuch as the areas 21 and 22 will not be affected, due to the treatment mentioned heretofore, it is possible to change the developed image 24 to a transparent red color and leave the portions 21 and 22 uncolored.

For this purpose we may proceed as follows:—

First, we immerse in a copper-toning bath which is an equal mixture of the two solutions A and B.

*A*

Cupric sulphate 7 grams, potassium citrate (neutral) 28 grams, water 1000 ccs.

*B*

Potassium ferricyanide 6 grams, potassium citrate (neutral) 28 grams, water 1000 ccs.

Then dye in the following solution:
Phenosaffranine, one part in 2,000 of water with a few drops of acetic acid.

The finished result is shown at Figure 9 in which the portion 24 is now of a transparent red color. Upon viewing by transmitted light, the area 24 which was red in the subject 1, is seen as red, the area 23, which was white, is seen as white, the area 21 which was green is seen as black and the area 22, which was black, is seen as black.

While the negative records 6 and 7 are shown as separate pieces, this is by no means a requirement in the carrying out of our process. By printing on an emulsion sensitive to red and green light, the two records may be separately printed from the red record by using green light and the green record by using red light. The procedure would otherwise be the same as described for the negatives 6 and 7.

While no mention is made of the use of our process for cinematographic work, we desire to have it understood that nothing herein contained is to prevent us from so doing, since a cinematographic film would simply be a plurality of the single images shown in the drawings.

Having thus described our invention what we claim as new and desire to secure by Letters Patent:—

1. A process in photography, which consists in first producing two geometrically alike photographic negative record transparencies of a subject, one being made by the action of rays from a certain desired part of the spectrum, the other being made by rays from other than said desired part, then recording in a light sensitive emulsion a positive image from the negative record transparency which was made by the rays from said desired part of the spectrum, by passing light through said transparency to said light sensitive emulsion, then developing the resulting image but not fixing it, then treating the developed image so that it will not be affected by a subsequent coloring process, then bringing into registry with the positive image so produced, the other geometrically alike negative-record transparency, then passing light through the said transparency to the emulsion containing the positive image, this exposure being made on the same face as the other was, then developing and fixing the resulting image and then coloring with a process that will substitute coloring matter for the developed image-forming material produced by the second printing and developing but will leave uncolored the developed image produced by the first printing and developing.

2. A process in photography, which consists in recording in a light sensitive emulsion a positive image from a negative-record transparency, by passing light through said transparency to said light sensitive emulsion, then developing the resulting image but not fixing it, then treating the developed image so that it will not be affected by a subsequent coloring process, then recording in the unexposed portions thereof another image from a different negative-record transparency by passing light rays to it through said transparency, this exposure being made on the same face as the other was, then developing and fixing the resulting image and then coloring with a process that will substitute coloring matter for the developed image forming material produced by the second printing and developing, but will leave the developed image-forming material produced by the first printing and developing uncolored.

3. A process in photography, which consists in first simultaneously producing two geometrically alike negative record transparencies of a subject, one being made by the action of rays from a certain desired part of the spectrum, the other being made by rays from other than the said part, then recording, in a light sensitive emulsion a positive image from the negative record transparency made by the rays from the said desired part of the spectrum by passing light through the said negative transparency to the said light sensitive emulsion, then developing the resulting image but not fixing it, and using the resulting image as a mask, so that when the other negative-record transparency is registered with it, the combination of the said negative-record transparency and the positive just produced will substantially prevent light from acting except at those portions that were of substantially the same color, in the subject, as is represented by the desired part of the spectrum heretofore mentioned, the said portions being recorded in the hitherto unexposed portions of the light-sensitive emulsion.

4. An article of manufacture, which consists of a single colloid coating on a transparent carrier, containing in combination on the same face a black image and another image of which the black image has been rendered inert to the processing by which the other image was colored.

FREDERIC EUGENE IVES.
JACOB F. LEVENTHAL.